United States Patent [19]

Schuck et al.

[11] Patent Number: 5,243,821
[45] Date of Patent: Sep. 14, 1993

[54] METHOD AND APPARATUS FOR DELIVERING A CONTINUOUS QUANTITY OF GAS OVER A WIDE RANGE OF FLOW RATES

[75] Inventors: Thomas W. Schuck, Easton; James VanOmmeren, New Tripoli, both of Pa.

[73] Assignee: Air Products and Chemicals, Inc., Allentown, Pa.

[21] Appl. No.: 720,119

[22] Filed: Jun. 24, 1991

[51] Int. Cl.$^5$ .............................................. F17C 13/00
[52] U.S. Cl. ...................................... 62/50.6; 62/50.1; 417/53; 417/902
[58] Field of Search .................. 62/50.1, 50.6; 417/53, 417/902

[56] References Cited

U.S. PATENT DOCUMENTS

| | | | |
|---|---|---|---|
| 2,292,375 | 8/1942 | Hansen | 62/50.6 |
| 2,632,302 | 3/1953 | Steele | 62/50.1 |
| 2,657,541 | 11/1953 | Schilling | 62/50.1 |
| 2,854,826 | 10/1958 | Johnston | 62/50.6 |
| 3,018,633 | 1/1962 | Halliwell | 62/50.1 |
| 4,481,781 | 11/1984 | Tsukamoto | 62/50.6 |
| 4,559,786 | 12/1985 | Schuck | 62/50.6 |
| 4,570,578 | 2/1986 | Peschka et al. | 62/50.6 |
| 4,932,214 | 6/1990 | Nieratscher et al. | 62/50.6 |

*Primary Examiner*—Ronald C. Capossela
*Attorney, Agent, or Firm*—James C. Simmons; William F. Marsh

[57] ABSTRACT

Method and apparatus for delivering high pressure gas to a point of use over a wide range of flowrates by storing said gas as a cryogenic fluid, removing said cryogenic fluid by means of a single stage reciprocating piston-type pump/compressor adapted to utilize liquid, vaporized liquid, a mixture of liquid and vaporized liquid, or supercritical fluid as the inlet fluid to said pump while maintaining the inlet fluid under cryogenic conditions. Blowby from the pump is recycled to the system. Discharge fluid may also be recycled to the system.

13 Claims, 2 Drawing Sheets

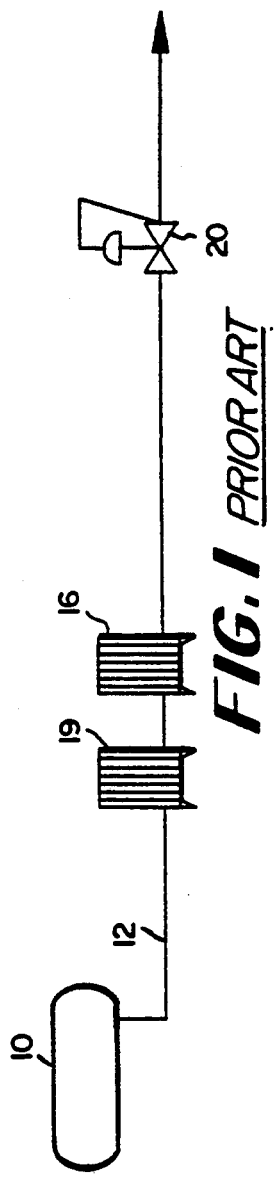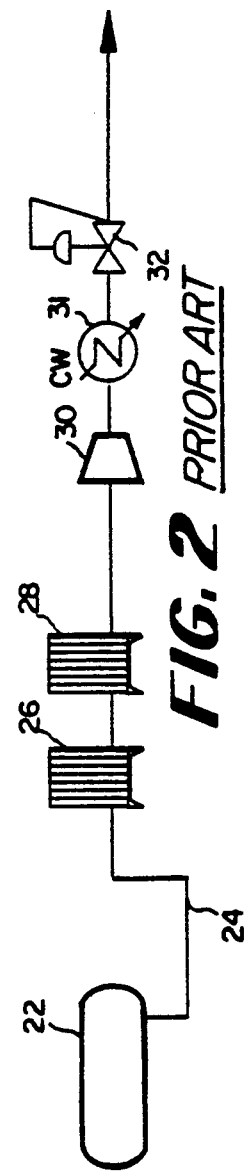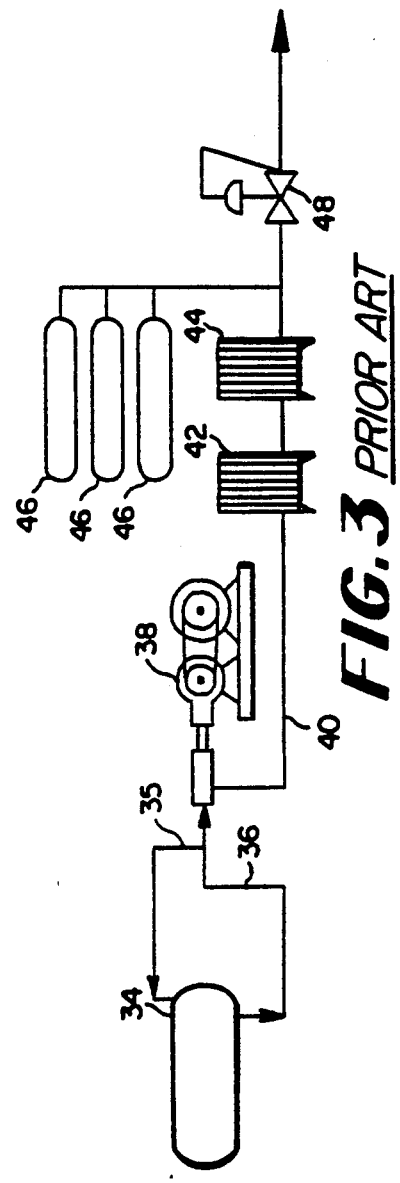

METHOD AND APPARATUS FOR DELIVERING A CONTINUOUS QUANTITY OF GAS OVER A WIDE RANGE OF FLOW RATES

FIELD OF THE INVENTION

The present invention pertains to delivery of industrial gas to a customer at elevated pressure.

BACKGROUND OF THE INVENTION

Conventional transportation and storage of industrial gases such as hydrogen takes place with the gas in the form of a liquid, the liquefied gas being referred to as a cryogen or a cryogenic liquid. In liquid form a larger quantity of the product can be stored in a smaller space than if the product were in the gaseous form. A major problem with transportation and storage of gases in liquid form is that it is impractical (i.e. excessive cost in equipment is required) to have a continuous quantity of gaseous product available to the customer at the point of use at pressures exceeding those obtainable by using a standard cryogenic storage container. Normally the product, as it is withdrawn from the storage vessel, passes through a heat exchanger to raise the temperature to that of ambient. If the gas is to be delivered to the point of use at pressures above the storage vessel pressure, the internal pressure of the gas must be raised by means of an expensive warm gas compressor.

The most common method of solving the problem of delivery of continuous quantities of product gas at high pressure is to store the product as a gas at high pressure and ambient temperature in stationary or mobile gas storage vessels. One type of vessel is the well known high pressure tube, or banks of tubes, adapted for being towed to the site in the form of a tube trailer. The storage pressure for this type of product is higher than the use pressure and is regulated to the use pressure by conventional pressure regulators. This method presents the problems of filling the stationary vessels or replacing the mobile ones as they approach use pressure. Also, the total quantity of product available "on-site" above use pressure is typically small unless a large number of costly high pressure tubes or tube trailers are used.

Another method is to store the product as liquid in the low pressure container and pump the liquid, batchwise, to high pressure (exceeding use pressure). High pressure storage vessels are also required to store the gaseous product prior to usage. The method of liquid feed to these pumps can induce cavitation or vapor choking which is damaging to the unit, and is potentially dangerous in flammable or oxidizing gas service. Also, this type of pump tank system promotes excessive product venting due to repeated cooldowns, thermal stratification of the liquid in the tank and partial losses of insulating vacuums in the conventional cryogenic storage tank and associated plumbing insulation, these problems being especially acute where the customer has a low usage rate for the product.

Another method of solving the problem is to pressurize warm gaseous product to the required use pressure from a low pressure storage container using warm gas compressors. This method requires larger equipment, with capital costs 5 to 10 times higher than cryogenic pressurization, due to the low density of the compressor feed. Operating costs are considerably higher for maintenance and electricity and cooling water is necessary for the compressor. A much smaller pressure ratio is achieved per stage in the compressor since the feed is at ambient temperatures so more stages may be necessary to reach a desired discharge pressure versus that which would use cryogenic equipment.

One other method used to solve the problem involves constructing a special cryogenic container to hold high pressure product and regulate the product to use pressure. This method requires the use of special tanks which are extremely expensive, have a practical pressure limit (about 750 psig) for any storage advantage over warm high pressure vessels, require special filling equipment or extreme venting to enable filling thus taking the system off-line, elaborate or extensive pressure building systems all leading to problems in protecting the tank from over-pressure scenarios or situations. Also such high pressure cryogenic containers may exceed the fluid's critical pressure, raising concerns with the vessel's safety vent system for use with supercritical fluid.

BRIEF DESCRIPTION OF THE INVENTION

The present invention overcomes the foregoing problems by combining the insulated storage tank to store the product gas as a liquid in combination with a cryogenic pump/compressor, the inlet of the pump/compressor being adapted through insulated means to utilize vaporized cryogen usually found above the liquid in the storage tank, a mixture of cryogenic liquid and vaporized liquid or supercritical fluid as the inlet to the pump/compressor. By means of varying the inlet to pump either liquid vapor or a mixture of the two, the mass flowrate of the pump/compressor can be controlled steadily over a wide range from about 500 standard cubic feet per hour (SCFH) to over 100,000 SCFH. The system can optionally include using a portion of the pump/compressor outlet to control compressor flowrate and/or using cooled piston ring leakage (blowby) as a portion of the inlet to the compressor or for return to the storage vessel to minimize or eliminate system leakage and maximize recovery of product gas for use by the customer.

BRIEF DESCRIPTION OF THE DRAWING

FIG. 1 is a schematic representation of a prior art system for storing and delivering an industrial gas to a customer at pressures below storage vessel maximum allowable working pressure (MAWP).

FIG. 2 is a schematic representation of a system for delivering product gas to a customer at medium pressure.

FIG. 3 is a schematic representation of a prior art system for delivering a high pressure gas to a point of use.

DETAILED DESCRIPTION OF THE INVENTION

Figure 4:
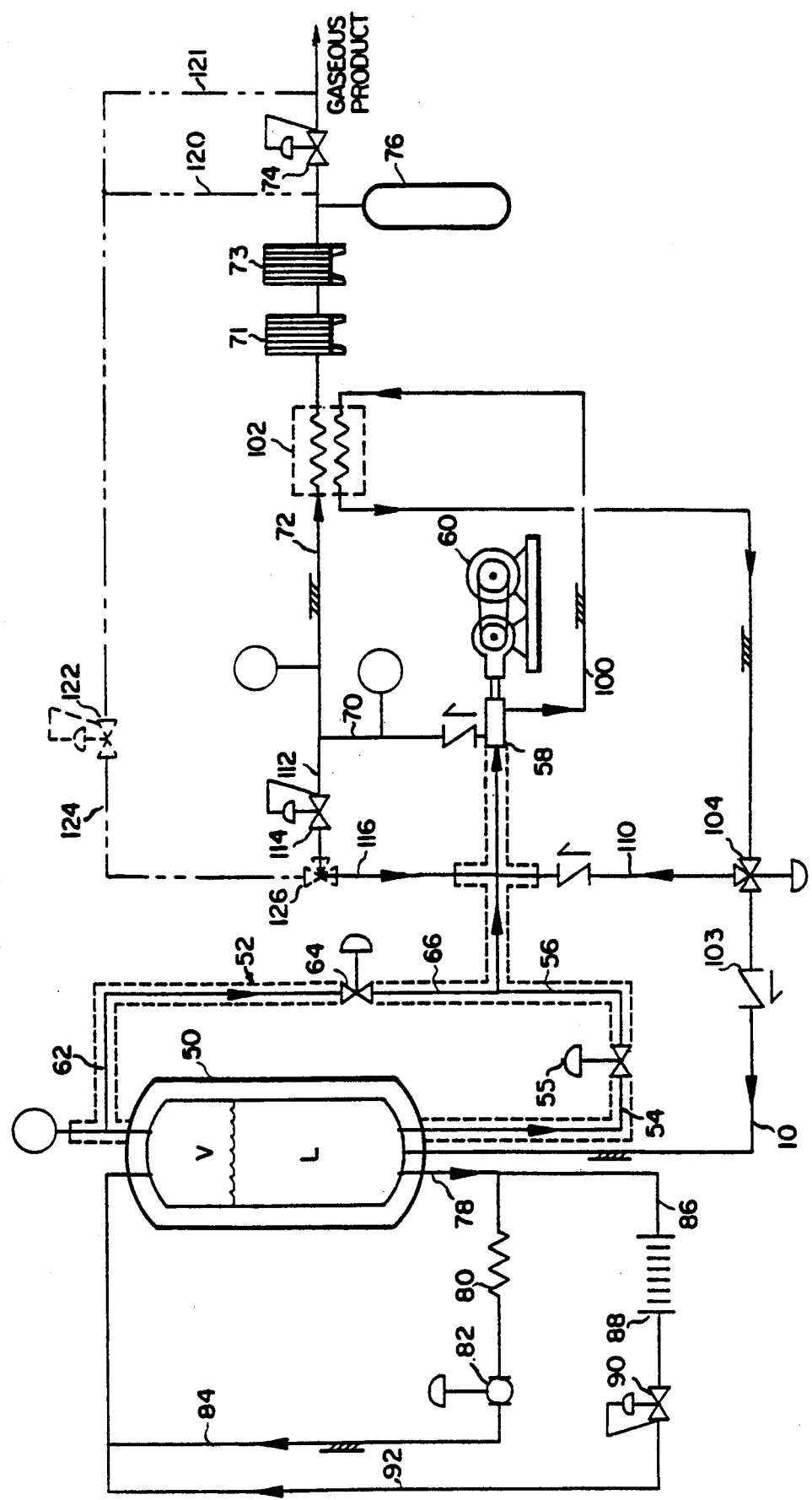
FIG. 4 is a schematic diagram of the system and method according to the present invention.

As shown in FIG. 1, a conventional system for providing a source of low pressure industrial gas, e.g., hydrogen, to a customer at a point of use includes storing the gas in an insulated container 10 in the form of a liquid. Liquid is withdrawn as needed from the tank 10 through line 12, passed through vaporizers 14 and 16 to the point of use through a control valve 20. During periods of low demand or no demand, liquefied gas in tank 10 vaporizes due to system heat leak, collects above the liquid and if overpressurization occurs, gas from tank 10 is vented safely for disposal.

As shown in FIG. 2, a system for providing gas at the customer's point of use at pressures above storage vessel MAWP includes storing the gas in a cryogenic storage vessel 22, withdrawing vaporized cryogen from tank 22 through line 24, warming the withdrawn liquid in vaporizers 26 and 28 and raising the internal pressure of the warm gas by means of compressor 30 and dispensing the outlet of the compressor 30 through an aftercooler 31 and control valve 32. In a system according to FIG. 2, liquid at approximately −400° F. and 100 psig in the case of hydrogen is withdrawn from vessel 22. The gas is raised to ambient temperature by means of heat exchanger 26 and 28 while maintaining the internal pressure at approximately 100 psig and thereafter the pressure of the gas is raised from ambient to delivery pressure by means of compressor 30. Several stages of compression with intercooling may be necessary depending upon use pressure and fluid properties.

As shown in FIG. 3, a system for delivering a high pressure gas, e.g. hydrogen at 2200 psi, includes a cryogenic storage vessel 34 wherein liquid is withdrawn from the storage vessel 34 by means of conduit 36, passed to a cryogenic pump 38, the discharge of the pump conduit 40 being a gas at approximately −350° F. and 2700 psig thereafter raising the temperature of the gas in heat exchangers 42 and 44, with the product discharged from vaporizer 44 being at approximately 2600 psig and ambient temperature. Product thus produced can be stored in a series of high pressure storage containers 46 for satisfying the customer's needs which can be delivered through a control valve 48. In a system according to claim 3 it is possible for 30% or more of the product in tank 34 to vent as vapor and be lost.

As shown in FIG. 4 the apparatus of the present invention includes a cryogenic storage vessel 50 which has a system 52 consisting of a conduit 54 and control valve 55 connected to the tank 50 so as to withdraw liquid or supercritical fluid from the tank and deliver the fluid through a conduit 56 to the inlet 58 of a pump/compressor 60. System 52 includes a conduit 62 and control valve 64 adapted to remove vaporized cryogen contained above the liquid L in tank 50 or supercritical fluid for delivery through conduit 66 to the inlet 58 of the pump/compressor 60. System 52 may be insulated so that both the liquid and the vapor withdrawn from the vessel 50 can be maintained under cryogenic conditions. The outlet of pump 60 is connected through conduits 70, 72 and vaporizers 71, 73 through a control valve 74 to deliver gaseous product to the customer. The system optionally includes a gas storage vessel 76 to maintain an inventory of gas for use by the customer or to act as a surge vessel to contain thermally expanded product during system shutdowns, providing ventless operation.

As shown in FIG. 4, tank 50 typically includes a pressure building system including a withdrawal conduit 86, heat exchanger 88, control valve 90, return conduit 92 to pressurize the storage vessel 50 by withdrawing liquid and allowing it to warm up, expand and be returned as vapor to the vapor space V of tank 50. The optional auxiliary system can include a second loop consisting of conduit 78, heat exchanger 80, valve 82 and return conduit 84 to aid in maintaining pressure on the storage vessel 50. This auxiliary pressure build system may be designed to provide minimal pressure drop with a controlled heat input to maximize the flow capacity of pump/compressor 60 operating in vapor only mode.

The apparatus of FIG. 4 includes a conduit 100 to take piston ring leakage or blowby from the pump/compressor which is preferably a single stage reciprocating piston-type machine having a volume displacement of about 40 to 200 ACFH (actual cubic feet per hour) (producing 26,000 SCFH mass flowrate 135 psig at −400° F. gaseous inlet condition for hydrogen feed). The blowby in conduit 100 is passed through a blowby cooler 102 where the blowby is cooled by heat exchange with the discharge in conduit 72 from the pump/compressor and may be returned to a diverter valve 104. Diverter valve 104 permits the blowby to be returned to the liquid in tank 50 or to the inlet fluid being introduced into the pump/compressor 60. Alternatively, the cooled blowby can also be returned to tank vapor space.

The apparatus of FIG. 4 can include a conduit 112 so that a portion of the discharge from the pump/compressor 60 in conduit 70 is withdrawn still in the cryogenic state and passed through a control valve 114 through conduit 116 to the inlet fluid of the pump/compressor 60 to control the compressor flowrate by pressure regulation.

The pump/compressor 60 is of the reciprocating piston-type, for a given speed of rotation it displaces a constant volumetric flowrate. The pump/compressor being single stage can pressurize effectively from a wide range of inlet temperatures, pressures or densities since balance of the pressure ratio to feed subsequent stages is not necessary. The displacement of the pump/compressor can be quite small and still provide a large mass flow since its normal operation is in what is referred to as the cryogenic temperature range. As set out above, one type of pump/compressor that has been used has a volume displacement of about 200 ACFH to produce 26,000 SCFH mass flowrate (135 psig at −400° F. gaseous inlet conditions of hydrogen) while a warm gas compressor would require at least 26,000 ACFH to achieve the same mass flow at ambient temperature and pressure at its inlet.

With the system of the present invention, when startup occurs and the pump/compressor and the delivery lines are essentially at ambient temperature, product entering the pump/compressor is warm and the flowrate through the unit is correspondingly low.

As more liquid or cold vapor is withdrawn from vessel 50, lines 54, 56, 62 and 64 and the compression end of the pump/compressor 60 begin to cool, the inlet density increases and the pump/compressor 60's mass flow rate increases. Thermal insulation of both the vessel 50 and the inlet system 52 can reduce the absorption of ambient heat and permit the pump/compressor 60 to operate at very low temperatures and correspondingly high inlet densities, thus high flow rates.

With the system according to the present invention, the flow rate of the pump/compressor can be controlled steadily over a very wide range from 500 SCFH to over 100,000 SCFH hydrogen to match the use flow by varying the inlet means to direct either vapor V through conduit 62,64, liquid through conduits 54,56, a mixture of liquid and vapor or supercritical fluid to the inlet of the pump/compressor 60. This permits the pump/compressor 60 to operate continuously to supply customer flow directly or store high pressure product in vessel 76 for future use. The amount of high pressure storage volume provided can be very small, since the inlet is readily controlled to match any customer usage.

A variable speed drive can also be employed on the pump/compressor drive to control the rotational speed and, hence, flow rate of the unit. The variable speed drive can be in addition to product inlet control to increase operational flexibility.

The system's determination for product inlet is based upon discharge pressure compared against use pressure, customer flow and the temperature of the compression end of the pump/compressor 60. Pure or mostly all liquid can be used as the inlet to the pump/compressor 60 on system startup to achieve high initial inlet densities by counteracting the cooldown delay for the inlet piping and the compression end of the pump/compressor 60. This capability is especially attractive on startup after a prolonged shutdown since the storage vessel can contain relatively warm gas in vapor space V (e.g., several hundred degrees warmer than the liquid L) in tank 50 due to heat leak and the immediate customer product flow can be satisfied quickly. As the inlet piping and compression end of the pump/compressor 60 cool and customer flow is met, vaporized cryogen V can be introduced into the inlet of the pump/compressor 60 to regulate the discharge pressure and thereby to match the customer flow as needed. Liquid throttle valve 55 controls liquid feed rate. This capability gives the operator the ability to maintain the storage container pressure below the maximum allowable working pressure and prevent the tank from venting as is common with the conventional cryogenic pump/tank system as shown in FIG. 3. During low customer usage, total vapor inlet can supply the customer need. During peak customer usage, total liquid inlet can supply the need. An additional benefit of the system of the present invention is that small doses of liquid can be provided as needed to keep the discharge temperature of the pump/compressor 60 below the operating limit of +400° F. during mostly vapor usage. This will avoid a shutdown due to high discharge temperature of the product from the pump/compressor 60. The flow range of the system is much wider than either a conventional pump or a compressor alone.

The pumping attributes using a total liquid supply may be made different than conventional cryogenic pumps since the system can be a "pressure-fed" system rather than a "gravity-fed" system. The inlet of the gravity-fed machine has a vapor return line and providing sufficient NPSH is difficult, especially for low density products like hydrogen and helium, since only liquid head pressure is used. Therefore, the possibility of pump cavitation is continuously present. The pressure-fed capability of the present invention can yield higher flow rates than achieved in practice by gravity-fed pumps, and cavitation no longer applies since the full storage container pressure is used to force feed the pump/compressor. The storage container pressure is usually well above the liquid saturation pressure.

As shown in FIG. 4, the optional device to control the system flow includes internal recycle by a conduit 112, valve 114, and conduit 116. If a user is drawing very little product while the pump/compressor is operating in a pure vapor inlet mode and the system is not to be shut down, the recycle loop can be used to recycle a portion of discharge back to the inlet of the pump/compressor 60 and effectively reduce the net system flow to match the low usage rate. This method can be performed either by simple back pressure regulation or with a pressure control valve monitoring system discharge pressure and customer use flow.

As shown in FIG. 4, piston ring leakage (blowby) is returned to the system for recompression via conduit 100 to avoid a venting loss, but its return point is variable to allow greater flexibility depending upon the pump/compressor inlet option and storage container condition. If the pump/compressor is providing more of a pumping function by having mostly liquid at the inlet, the storage container pressure will generally not need to be increased, since the pressure reduction effect of removing liquid from the tank is small. Therefore, it is not desirable to add the blowby back to the tank, since pressure will increase and the tank could vent. In this instance, the blowby is introduced into the suction of the pump/compressor 60 so it is not a venting loss. The amount this blowby recycle decreases the pump/compressor flow is negligible compared to the flow potential using mostly liquid.

If the pump/compressor is providing more of a compressing function by having mostly vapor at the inlet, the storage container pressure will need to be maintained with cold gas to provide high inlet vapor density to the unit and achieve the desired flow rate. Returning the blowby to the top of the tank defeats this purpose by recycling relatively warm gas eventually back to the suction of the pump/compressor and reducing the flow capability too far. Therefore, the blowby can be bubbled back through the cryogenic liquid, thus promoting the production of saturated gas in the top of vessel 50 by boiling a portion of the liquid in the vessel. In this mode, the blowby is the primary means of maintaining storage container pressure during compressor-type operation.

In either case, the blowby does not constitute a venting loss. Also, the blowby is first cooled against the immediate pump/compressor discharge flow in a blowby aftercooler 102 to recover refrigeration available in the discharge stream before being recycled back to the system in either fashion. The blowby lines may be thermally insulated to preserve the coldest recycle temperature possible. Check valves set to operate at about 5 psig opening pressure above the back pressure on them can be used in both blowby return lines to back pressure the piston blowby slightly.

Under extremely high flow conditions it may be beneficial to return blowby to the vapor space of tank 50 or into conduits 62, 66 by means of insulated or non-insulated conduits. In another mode it may be desirable to return blowby to the liquid in tank 50.

As shown in FIG. 4 in dotted lines, an alternate method of controlling compressor flow rate through compressor regulation can be achieved by taking warmed product gas through conduit 120 or 121 and control valve 122 and returning the warmed product gas through conduit 124 to a valve system, e.g. a 3-way valve 126 to permit the operator to select warm or cold gas to (by pressure regulation) control compressor flow rate as described in connection with FIG. 4. A similar system permits automatic defrost for continuous usage systems with two pump/compressors in parallel. In this mode, one machine can be on-line for several days. When the ice buildup is excessive on the unit and discharge piping (a function of continuous running hours), the second machine can be brought on line. As the second unit cools down and produces higher flows, the first machine will internally recycle more warm gas. When the second machine is providing full customer flow, the first machine will approach full recycle. The first unit will then defrost in short order and can be placed on standby for future use, when needed.

While the system has been described as being used to compress cold, gaseous hydrogen, this system could be used for cryogenic pressurization of helium, nitrogen, oxygen, argon, carbon dioxide, methane, natural gas, hydrogen, hydrocarbons and other cryogens including mixtures of these cryogens, either as liquid, vapor or a mixture of a liquid and vapor of the cryogens or supercritical fluid.

A system according to the present invention operates at a nominal operating temperature near the saturated temperature of the product at the storage container pressure. This can vary from about +70° F. to −450° F. The design temperature range is from −452° F. to +400° F. with the inlet to the pump/compressor being either superheated gas, saturated gas or liquid, subcooled liquid, supercritical fluid, or mixtures thereof.

In general, a typical customer station tank pressure is acceptable as the inlet pressure with the understanding that higher inlet pressures can yield higher mass flows in the compressor mode of operation of the pump/compressor 60. Therefore, suction pressure is limited only by the specific storage vessel and inlet piping characteristics. The inlet pressure can vary from 0 psig to the maximum design pressure of the storage and inlet system.

For the system according to the present invention, the current discharge pressure range is from storage container pressure (no pressurization) to 6000 psig. There are no current applications above 6000 psig discharge pressure, but a system according to the present invention can be utilized to provide higher pressures depending upon the fluid being pressurized.

The discharge temperature limit is +400° F. based upon the properties of the materials of construction of the compression end of the pump/compressor.

According to the present invention, the primary benefit is the higher pressure product than can be provided by conventional storage vessel means, over large ranges of flow and pressure. The pressurized discharge can be used directly, still in a relatively cold state, or warmed further by heat exchange to any desired condition, including ambient temperatures or higher. With the system according to the present invention, the storage vessel may have less thermal stratification and the system, if sized correctly, prohibits the customer from being without product. The system of the invention also permits use of more of the vessel inventory than conventional liquid pump systems.

The system of the present invention permits product to be stored at the use point as liquid so it is most efficient for transport and storage providing a large, on-site storage capability including the advantages of cryogenic liquid purity rather than bulk gas purity.

The system of the present invention can be operated with the pump/compressor as a cryogenic compressor to reduce the storage container pressure by withdrawing gas from the vessel, but can achieve flow rates much greater than typical warm gas compressors, when necessary. This permits deployment of a system according to the invention for small users with possible large peak flows, rather than utilizing multiple machines or one large machine with a large warm storage volume or with a pump/tank system hybrid in which a conventional pump and pump/compressor are installed in parallel. The system flow and pressure can be easily controlled with any of the methods described to match the usage flow. The system of the present invention can be operated with the pump/compressor as a cryogenic pump by withdrawing liquid from the vessel to provide large peak flows, but can have its discharge flow rate almost infinitely variable to match the customer's usage via the mixed vapor/liquid feed capability of the system, thus avoiding costly, high pressure warm gas storage. Therefore, the system can provide continuous operation while the customer is on-line to avoid repeated cooldowns and the associated heat input back to the storage container.

With the system of the present invention, venting will be greatly reduced during normal operation and short shutdowns since the blowby is recooled and recycled to the least affected system area, depending on the operating mode.

A system according to the invention provides a much smaller unit than equivalent warm compressors and has less operating cost requirement. A system according to the present invention also provides a lower capital cost than a pump system with greatly reduced system product venting.

Having thus described our invention, what is desired to be secured by letters patent of the United States is set forth in the attached claims.

We claim:

1. A system for delivering a high pressure gas to a point of use over a wide range of flowrates comprising in combination
    a storage container capable of storing said gas as liquid or liquid and vaporized liquid or as a supercritical fluid;
    means to transfer fluid being liquid, vaporized liquid, supercritical fluid or mixtures thereof to the inlet of a single stage reciprocating piston-type pump/compressor said means including first means to direct liquid or supercritical fluid from said storage vessel to said inlet and second means to direct vaporized liquid or supercritical fluid from the vapor space over said liquid contained in said storage container to said inlet;
    control means to selectively direct liquid, vaporized liquid, a mixture of liquid and vaporized liquid, or supercritical fluid to the inlet of said pump; and means including a conduit to move said liquid, vaporized liquid, a mixture of liquid and vaporized liquid, or supercritical fluid from the outlet of said pump/compressor to a vaporizer and through a control valve to deliver a high pressure gas at the valve inlet.

2. A system according to claim 1 including means to remove blowby from said pump/compressor and recycle said blowby selectively to liquid space in said storage container or to said vaporized liquid space in said storage container or the inlet conduit of said pump/compressor.

3. A system according to claim 2 including means to cool said blowby prior to return to said storage container or the inlet conduit of said pump/compressor.

4. A system according to claim 3 including insulated means for returning said blowby from said cooling means to said storage container or said pump/compressor.

5. A system according to claim 1 including means to use said pump/compressor outlet gas to control pump/compressor flowrates by regulating density of the inlet fluid to said pump/compressor.

6. A system according to claim 1 including means to recycle warmed outlet fluid from said pump/compressor to control compressor flowrate by regulating density of the inlet fluid to said pump/compressor.

7. A system according to claim 1 wherein said first means is a fluid flow control valve.

8. A system according to claim 1 wherein said second means is a fluid flow control valve.

9. A method for delivering high pressure gas as product to a point of use over a wide range of flowrates comprising in combination:
storing said gas as a liquid or liquid and vaporized gas or as a supercritical fluid ;
removing from said vessel a fluid selected from the group consisting of liquid, vaporized liquid, a mixture of liquid and vaporized liquid or supercritical fluid and directing the withdrawn fluid, maintaining temperatures below ambient, to the inlet of a single stage reciprocating piston-type pump/compressor; and
varying the inlet to said pump/compressor to be either liquid, vaporized liquid, a mixture of liquid and vaporized liquid or supercritical fluid to maintain the mass flowrate from the pump/compressor.

10. A method according to claim 9 including directing blowby from said pump/compressor to either said vessel liquid space, vaporized liquid space or the inlet fluid for said pump/compressor.

11. A method according to claim 10 wherein said blowby is cooled by heat exchange with fluid exiting said pump/compressor.

12. A method according to claim 9 including directing a portion of said pump/compressor discharge to said inlet fluid to aid in controlling pump/compressor flowrate.

13. A method according to claim 9 including warming said pump/compressor discharge and directing a portion of said warmed discharge to said inlet fluid to aid in controlling pump/compressor flowrate.

* * * * *